United States Patent [19]

Daws

[11] Patent Number: 5,265,547
[45] Date of Patent: Nov. 30, 1993

[54] DIVERTING VALVE USABLE IN APPARATUS FOR SELECTIVELY CREATING TRAMLINES

[76] Inventor: Gregory R. Daws, R.R. 1, Box 61, Michigan, N. Dak. 58259

[21] Appl. No.: 749,644

[22] Filed: Aug. 26, 1991

Related U.S. Application Data

[63] Continuation-in-part of Ser. No. 592,823, Oct. 4, 1990, Pat. No. 5,074,228.

[51] Int. Cl.[5] .............................................. F16K 1/00
[52] U.S. Cl. .................................. 111/175; 137/875; 137/625.44; 285/177
[58] Field of Search ................... 137/875, 876, 625.44; 111/175, 174; 285/12, 177; 403/301, 292

[56] References Cited

U.S. PATENT DOCUMENTS

| | | | |
|---|---|---|---|
| 346,821 | 8/1886 | Mock | 137/625.44 |
| 687,556 | 11/1901 | Carter | 285/177 |
| 925,053 | 6/1909 | Sturgis | 137/875 |
| 2,255,292 | 9/1941 | Lincoln | 137/875 |
| 3,266,255 | 12/1963 | Dougherty | 285/177 |
| 3,521,659 | 7/1970 | Seger | 137/625.44 |
| 3,599,711 | 8/1971 | Fowler | 137/875 |
| 3,602,531 | 8/1971 | Patry | 285/177 |
| 3,690,703 | 9/1972 | Philipps | 285/177 |
| 3,773,062 | 11/1973 | McIver | 137/875 |
| 3,866,628 | 2/1975 | Weber et al. | 137/875 |
| 4,514,244 | 4/1985 | Schaefer et al. | 285/177 |
| 4,712,812 | 12/1987 | Weir, III | 285/177 |
| 4,718,457 | 1/1988 | Luger | 137/875 |
| 4,872,785 | 10/1989 | Schrage et al. | 111/174 |
| 5,074,228 | 12/1991 | Daws | 111/175 |

FOREIGN PATENT DOCUMENTS

| | | | |
|---|---|---|---|
| 385941 | 4/1908 | Austria | 137/875 |
| 3805148 | 12/1988 | Fed. Rep. of Germany | 111/175 |

Primary Examiner—David H. Corbin
Assistant Examiner—Spencer Warnick
Attorney, Agent, or Firm—L. MeRoy Lillehaugen; Alan D. Kamrath

[57] ABSTRACT

The selective creation of tramlines is disclosed where the metered seed normally delivered through the outlet hose (18b) of the row planter unit (20b) corresponding to the desired location of the tramline is diverted by a butterfly valve (26) to one or both of the row planter units (20a, 20c) located adjacent to and on opposite sides of the row planter unit (20b). The butterfly valve (26) includes an inlet conduit (28) which intersects with first and second outlet conduits (30, 32) and a butterfly element (34) which is pivoted by a solenoid actuator (40) against the bias of a spring (36) to selectively block one of the outlet conduits (30, 32). In the preferred form, the diverting hose (44, 54, 56) from the butterfly valve (26) may extend through the housings (24) and be in direct communication with adjacent row planter units (20a, 20c) or may be connected to Y-shaped connectors (46) having a passage (50) intersecting with the passage (48) that the metered seed for the adjacent row planter units (20a, 20c) would normally pass for mixing the metered seed. A divider (52) may be provided for dividing the metered seed diverted by the butterfly valve (26) between the two adjacent row planter units (20a, 20c). A preferred form of the butterfly valve (26) is also disclosed including first and second shoulders (90) formed in the walls (64) of the housing (58) adjacent to the inlet passageway for nesting of the free edge of the butterfly element (34). Additionally, the head portion (80) of the butterfly element (34) includes a semicylindrical portion (86) pivotal within a semicylindrical depression (72) formed in the V-shaped outlet wall (68) of the housing (58) and includes a V-shaped portion (88) extending from the semicylindrical portion (86) to the flat surfaces (84) of the dividing portion (82) of the butterfly element (34).

20 Claims, 2 Drawing Sheets

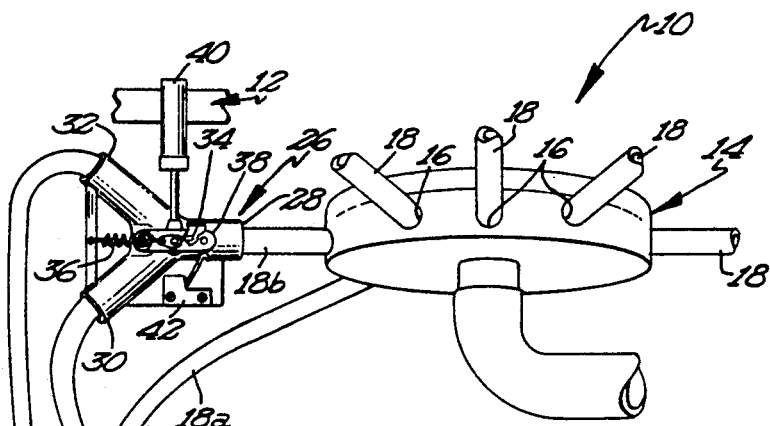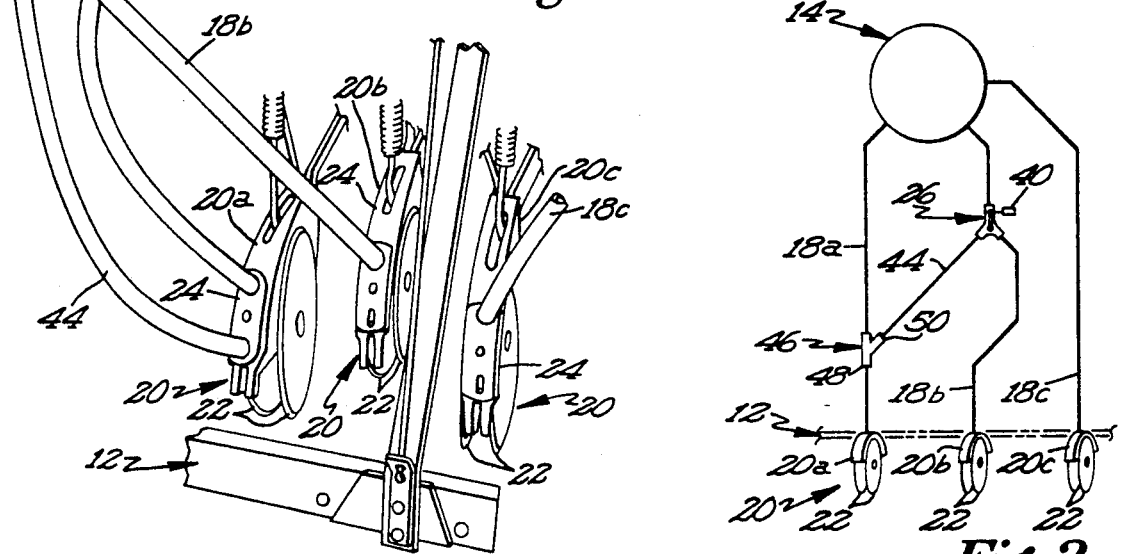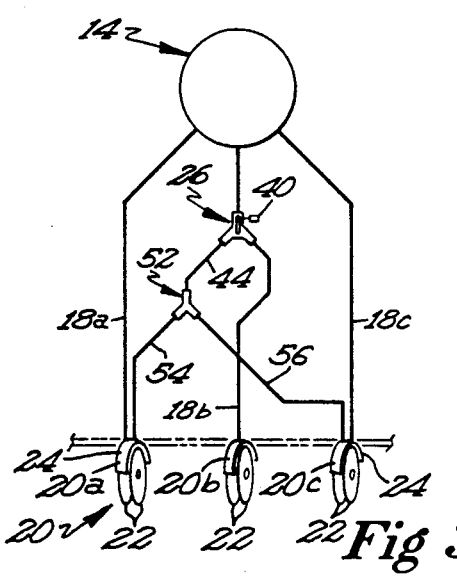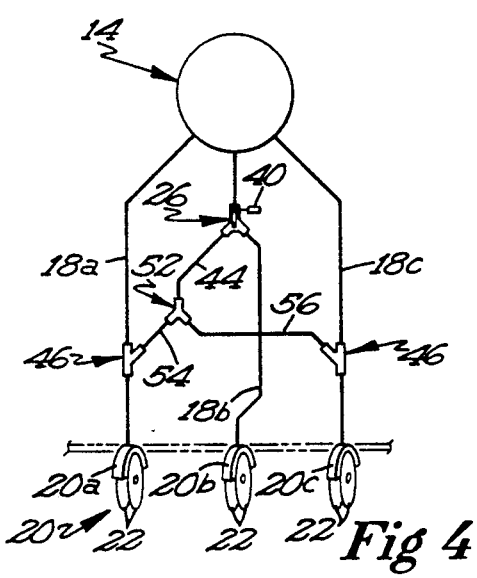

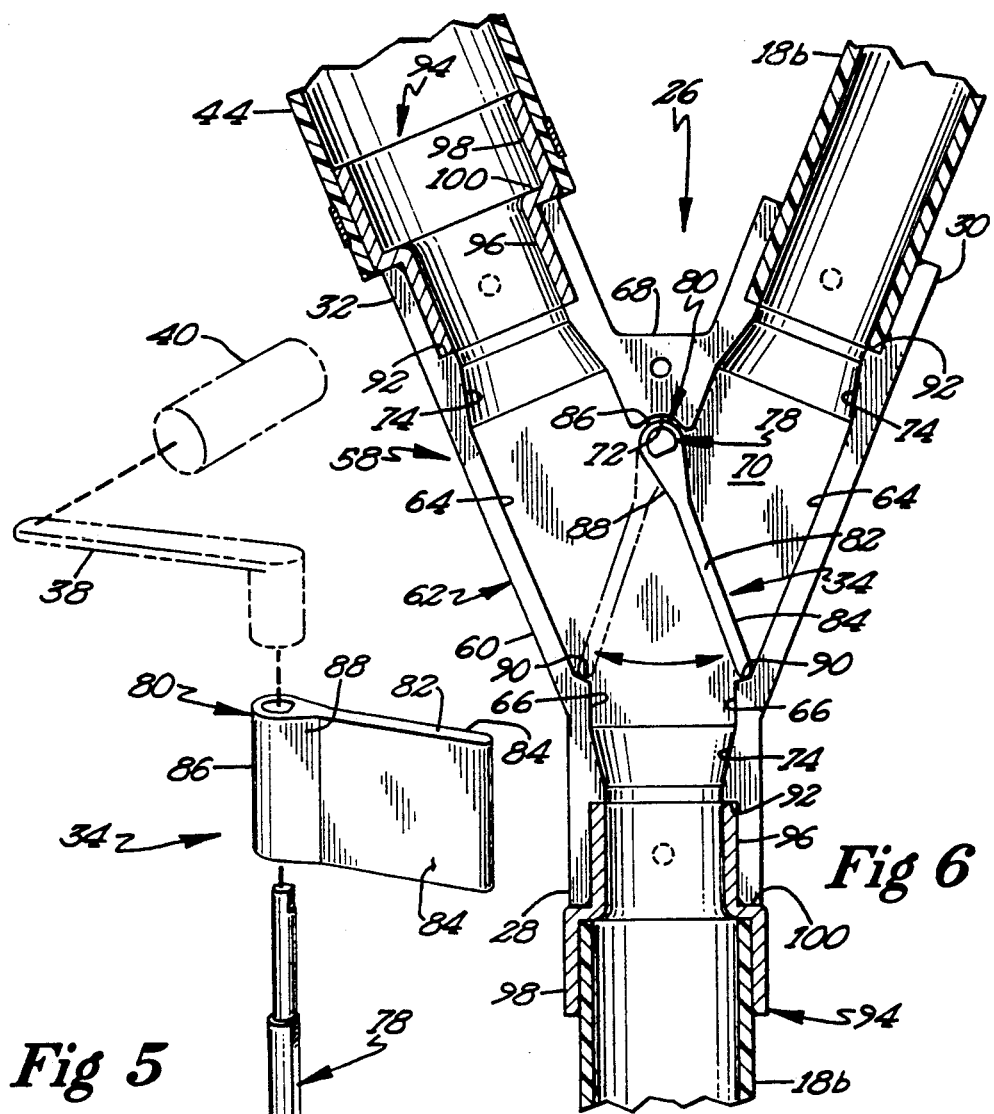
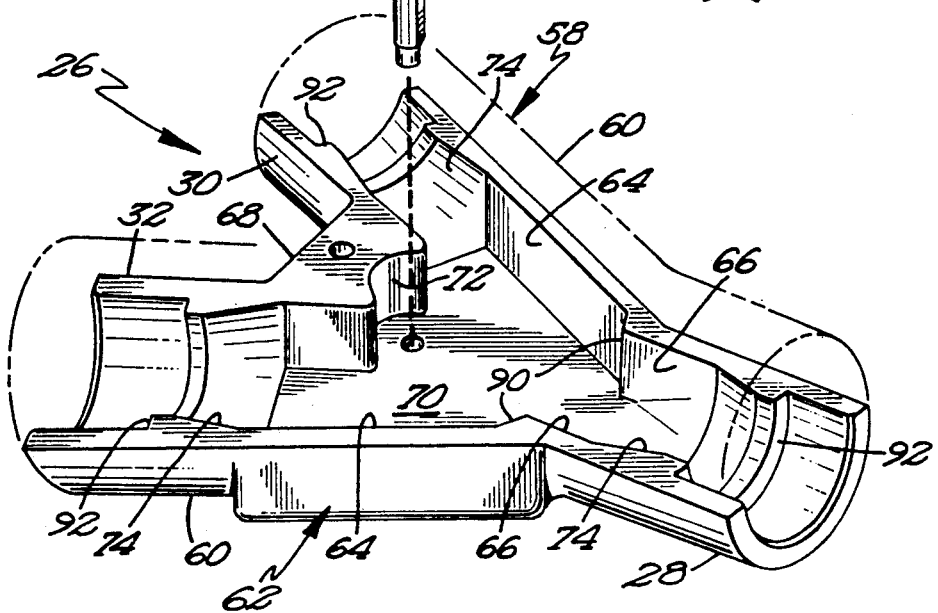

DIVERTING VALVE USABLE IN APPARATUS FOR SELECTIVELY CREATING TRAMLINES

This application is a continuation in part of Ser. No. 07/592,823, filed Oct. 4, 1990, now U.S. Pat. No. 5,074,228.

BACKGROUND

The present invention relates generally to apparatus and methods for creating tramlines, particularly to apparatus and methods for creating tramlines utilizing pneumatic seed planters, and more particularly to apparatus and methods for creating tramlines utilizing air seeders.

The awareness of the value of the use of tramlines or tracks intentionally left unseeded in fields of small grain or like cultivated crops has been increasing with farmers. Specifically, tramlines can be utilized as markers or guides in the fields. For example, tramlines may be utilized while spraying herbicides or other chemicals to eliminate spray overlaps and skips. With high cost, low dose chemicals, overlaps result in increased chemical costs and potential crop injury, while skips result in untreated areas. Likewise, tramlines make it possible to spray in low light conditions thus making it possible to take advantage of cool, calm spraying conditions at night. Spraying at night or early morning is advantageous because less water is needed, as evaporation is less of a problem and dew may be taken advantage of. Further, the stoma openings on the plants' leaves are open so less chemical is needed for the desired results. Further, as no seeds are planted in the tramlines, anything growing in the tramlines indicates the presence of weeds or other wild seedlings such as wild oats.

Further, tramlines can be placed to correspond to the wheels of implements permitting multiple trips across the field without creating additional wheel tracks. Driving on plants may result in uneven maturation, which may be detrimental to the ability to straight combine the crop at harvest. Thus tramlines permit multiple trips across the field such as topdressing nitrogen late in the season to boost yields and protein in a good year, to apply fungicides and growth regulators as often as needed to guard a bumper crop against disease and lodging, and the like, without creating additional wheel tracks.

Prior to the present invention, tramlines were created by plugging the seed rows corresponding to the row where the tramline was desired. However, this had severe limitations in use. Specifically, plant population was reduced because seed was not planted in the blocked row. Further, it was often not necessary that tramlines be present on each pass of the drill. For example, if the width of the seed drill utilized is 41 feet (13 meters) and the width of the sprayer utilized is 82 feet (26 meters), tramlines are only necessary on one pass out of every two passes to create a pattern for spraying. Furthermore, when air seeders are utilized, the seed would often merely pile up behind the blocking means and when the blocking means was removed, the piled up seed would be simultaneously released creating an extreme seed population as well as wasting seed. Also, abutments or other obstructions to the smooth transition of seed in passageways can also cause seeds to pile up and/or can cause seed breakage especially where delivery of seed is made by propelling the seed utilizing forced air such as in air drills.

Thus a need exists to provide apparatus and methods for selectively creating tramlines in fields of cultivated crops which overcome the limitations of prior methods of creating tramlines.

Accordingly, it is an object of the present invention to provide novel apparatus and methods for selectively creating tramlines.

It is further an object of the present invention to provide such novel apparatus and methods where tramlines are created only on selective passes of the seeding device.

It is further an object of the present invention to provide such novel apparatus and methods where the delivery of the amount of metered seed which otherwise would have been delivered to the location of the tramline is not stopped or blocked.

It is further an object of the present invention to provide such novel apparatus and methods where the seed population is increased in the rows adjacent to the tramline to eventually cover and shade the tramline to help control weed growth in the tramline.

It is further an object of the present invention to provide such novel apparatus and methods where the metered seed which would have otherwise been delivered to the row planter unit corresponding to the desired location of the tramline is diverted to one or both of the adjacent row planter units.

It is further an object of the present invention to provide a novel diverting valve allowing the smooth transition of seed or like material from the inlet to the outlets to prevent pile up or breakage.

SUMMARY

Surprisingly, the above objectives can be satisfied in the field of seeding devices in the most preferred forms by selectively diverting the metered seed from the row planter unit corresponding to the location where the tramline is desired to one or both of the row planter units located adjacent to and on opposite sides of the row planter unit of the tramline.

In a further aspect of the present invention, an improved diverting valve is provided including first and second shoulder depressions formed in the outlet passageways adjacent to the inlet passageway for nesting of the free edge of the butterfly element when pivoted between the shoulder depressions to divert material to one of the outlet passageways.

In a preferred aspect of the present invention, the butterfly element is formed of one piece providing a smooth transition from the inlet to the outlet passageways and includes a V-shaped portion integrally connecting a semicylindrical portion and an elongated dividing portion having first and second, parallel divider surfaces spaced a distance less than the diameter of the semicylindrical portion, with the pivotal axis located within the semicylindrical portion and the V-shaped portion.

The present invention will become clearer in light of the following detailed description of illustrative embodiments of this invention described in connection with the drawings.

DESCRIPTION OF THE DRAWINGS

The illustrative embodiments may best be described by reference, to the accompanying drawings where:

FIG. 1 shows a partial, perspective view of an air drill including an apparatus for selectively creating a tramline by methods according to the preferred teachings of the present invention.

FIG. 2 shows a partial, diagramatic view of an air drill including an alternate embodiment of an apparatus for selectively creating a tramline by methods according to the preferred teachings of the present invention.

FIG. 3 shows a partial, diagramatic view of an air drill including an alternate embodiment of an apparatus for selectively creating a tramline by methods according to the preferred teachings of the present invention.

FIG. 4 shows a partial, diagramatic view of an air drill including an alternate embodiment of an apparatus for selectively creating a tramline by methods according to the preferred teachings of the present invention.

FIG. 5 shows an exploded, perspective view of the lower half of a butterfly valve according to the preferred teachings of the present invention which can be utilized in the apparatus for selectively creating a tramline of FIGS. 1-4, with the upper half being shown in phantom.

FIG. 6 shows a top plan view of the lower half of the butterfly valve of FIG. 5.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "end", and similar terms are used herein, it should be understood that these terms have reference only to the structure shown in the drawings as it would appear to a person viewing the drawings and are utilized only to facilitate describing the invention.

DESCRIPTION

Apparatus for selectively creating tramlines by methods according to the preferred teachings of the present invention is shown in the drawings utilized in conjunction with an air drill 12 and generally designated 10. Air drill 12 generally includes a plenum 14 including a plurality of openings 16 around its periphery. Outlet hoses 18 extend from each opening 16 to a row planter unit 20, with drill 12 including a plurality of units 20 in a spaced, parallel arrangement. In the most preferred form, unit 20 is a furrow opener and includes first and second discs 22 held at an angle by a housing 24 to create a row opener for the seed. For each unit 20, hose 18 extends through housing 24 and drops the seed between discs 22 of unit 20. Plenum 14 is in communication with a forced air device, such as a centrifugal blower or fan, which forces air into outlet hoses 18 propelling metered seed out outlet hoses 18 to a row planter unit 20. It can then be appreciated that plenum 14 and hoses 18 deliver generally equal amounts of metered seeds to each of row planter units 20 for planting thereby into spaced, parallel rows.

Apparatus 10 generally includes a member for selectively diverting seed delivered to the outlet hose 18b of the planter unit 20b of the selected location along the width of air drill 12 and diverting such seed to one or both of planter units 20a and 20c located adjacent to and on opposite sides of planter unit 20b. In the preferred form, a butterfly valve 26 is interposed in hose 18b. Particularly, valve 26 includes a Y-shaped housing including a first inlet conduit 28 intersecting with first and second outlet conduits 30 and 32 at angles in the order of 135°. A butterfly element 34 is pivotally mounted adjacent to the intersection of conduits 30 and 32 and movable between a first position closing or blocking conduit 32 for preventing communication or passage of seed therethrough and allowing communication or passage of the metered seed between conduits 28 and 30 and a second position closing or blocking conduit 30 for preventing communication or passage of seed therethrough and allowing communication or passage of the metered seed between conduits 28 and 32. Element 34 is biased into its first position from its second position by a spring 36 having a first end anchored in a stationary position and second end attached to a lever arm 38 attached to the pivot axis of butterfly element 34. Element 34 is movable to its second position from its first position against the bias of spring 36 by a solenoid actuator 40 also secured to lever arm 38 for pivoting element 34 about its axis. Solenoid actuator 40 may be activated by any suitable means such as by a toggle switch located at a remote location such as in the cab of the tractor pulling air drill 12, by a computer chip which automatically activates and deactivates actuator 40 with each round of air drill 12, or by the like. It can be appreciated that element 34 may be moved by any other alternate motive means according to the teachings of the present invention. A suitable sensor 42 can be included to provide a signal such as an on/off light at a remote location such as in the cab of the tractor pulling air drill 12.

Conduits 28 and 30 are interposed in hose 18b such as by cutting hose 18b and attaching the outlet of the first part in communication with conduit 28 and attaching the inlet of the second part in communication with conduit 30.

The inlet of a diverting hose 44 is attached to and in communication with conduit 32. In a first preferred form shown in FIG. 1, the outlet of diverting hose 44 is in direct communication with unit 20a, extends through housing 24, and drops the seed between discs 22 of unit 20a generally parallel to seed dropped between discs 22 of unit 20a by hose 18a.

In an alternate form of the present invention shown in FIG. 2, hose 18a includes a Y-shaped connector 46 including a first straight passage 48 through which the metered seed would normally pass through hose 18a to unit 20a and a second, angled passage 50 intersecting with the passage 48 at an acute angle in the order of 30°. The outlet of diverting hose 44 is attached to and in communication with passage 50. Thus, seed passing through hose 44 would pass into connector 46 and mix with seed normally passing to unit 20a through hose 18a. It can be appreciated that connector 46 may be utilized when housing 24 of unit 20 does not have suitable space or provisions for connection of diverting hose 44 directly to unit 20 such as in a manner shown in FIG. 1.

In still other alternate forms of the present invention shown in FIGS. 3 and 4, diverting hose 44 is in communication with a divider 52 which divides any seed between first and second subsidiary diverting hoses 54 and 56. The outlet of diverting hose 54 may either extend through housing 24 and drop seeds between discs 22 of unit 20a generally parallel to seed dropped between discs 22 of unit 20a by hose 18a in a manner as shown in FIG. 3 or may be attached to passage 50 of connector 46 interposed in hose 18a and mix seed with seed passing through hose 18a as shown in FIG. 4. The outlet of diverting hose 56 may either extend through housing 24 and drop seeds between discs 22 of unit 20c generally parrallel to seed dropped between discs 22 of unit 20c by hose 18c in a manner as shown in FIG. 3 or may be attached to passage 50 of connector 46 interposed in hose 18c and mix seed with seed passing through hose 18c as shown in FIG. 4.

A preferred form of valve 26 according to the preferred teachings of the present invention is shown in FIGS. 5 and 6. Particularly, valve 26 includes a Y-shaped housing 58 formed by upper and lower halves 60 secured together by any suitable means, not shown, such as integral ears on halves 60 secured together by bolts, rivets or the like. Particularly, housing 58 includes a Y-shaped main body section 62 having side walls 64, inlet walls 66, outlet wall 68, and top and bottom walls 70. First and second side walls 64 are flat and planar and extend at an angle in the order of 50° and specifically 55° to each other. First and second inlet walls 66 are flat, planar and parallel to each other, with walls 66 being integral with and intersecting walls 64 at an angle in the order of 160° and specifically 157½°. Outlet wall 68 is generally V-shaped and positioned intermediate walls 64 spaced from inlet walls 66 and having flat, planar, outer surfaces parallel to walls 64. Top and bottom walls 70 are also flat and planar and are integral with and intersect walls 64, 66, and 68 at generally perpendicular angles. V-shaped outlet wall 68 includes a generally semicylindrical depression 72 at the intersection of the flat, planar, outer surfaces thereof. The inlet passageway defined by walls 66 and 70 is generally of a square cross section and is integrally connected to inlet conduit 28 by an interconnecting portion 74 where the passageway blends from the square cross section of body section 62 to a round cross section of inlet conduit 28. Similarly, the outlet passageways defined by walls 64 and 70 and the outer surfaces of wall 68 are generally of a square cross section and are integrally connected to outlet conduits 30 and 32 by interconnecting portion 74 where the outlet passageways blend from the square cross section of body section 62 to a round cross section of outlet conduits 30 and 32, with the outlet passageways and outlet conduits 30 and 32 having the same cross sectional size as the inlet passageway and inlet conduit 28 in the preferred form.

In the most preferred form, butterfly element 34 is formed of one piece and is secured to a shaft 78 pivotally mounted in and between walls 70 generally within depression 72. Generally, butterfly element 34 includes a head portion 80 and a dividing portion 82. Dividing portion 82 is flat and planar of a rectangular shape and cross section and includes parallel, flat, divider surfaces 84. Dividing portion 82 terminates in a free edge having a thickness generally equal to the thickness between surfaces 84 and extends substantially the full length of butterfly element 34 (over 70% in the preferred form) from the free edge to the pivot axis defined by shaft 78. Head portion 80 includes a semicylindrical portion 86 of a diameter larger than shaft 78, larger than the thickness of dividing portion 82, and complementary to and for concentric pivotal movement inside of depression 72. Head portion 80 further includes a generally V-shaped portion 88 extending inwardly from and integrally connecting the outside surfaces of semicylindrical portion 86 with surfaces 84 of dividing portion 82. In the preferred form, the outside surfaces of V-shaped portion 88 extend at an angle in the order of 30° to each other.

Further, in the most preferred form, housing 58 further includes first and second shoulder depressions 90 integrally formed in and between the intersection of walls 64 and 66. Shoulder depressions 90 have a depth generally equal and corresponding to the thickness between surfaces 84 and for receipt of the free edge of dividing portion 82. In the preferred form, each shoulder depression 90 includes a flat, planar surface extending at an angle in the order of 22½° from walls 66. It can then be appreciated that butterfly element 34 is pivotal through an angle in the order of 40° in the preferred form between first and second shoulder depressions 90 from a first position shown in phantom in FIG. 6 allowing passage from inlet conduit 28 to outlet conduit 30 arranged at an angle in the order of 157½° and through the inlet passageway and the first outlet passageway defined by housing 58 and butterfly element 34 with the free edge of butterfly element 34 nested with first shoulder depression 90 of the right side of housing 58 in FIG. 6 and a second position shown in solid lines in FIG. 6 allowing passage from inlet conduit 28 to outlet conduit 30 arranged at an angle in the order of 157½° and through the inlet passageway and the second outlet passageway defined by housing 58 and butterfly element 34 with the free edge of butterfly element 34 nested with second shoulder depression 90 of the left side of housing 58 in FIG. 6.

Furthermore, in the most preferred form, interconnecting portion 74 blends the passageways to a round cross section of a size smaller than those of conduits 28, 30, and 32 to define a radially extending shoulder 92 according to the preferred teachings of the present invention. Further, in the preferred form, valve 26 includes removable adapter 94 for slideable receipt in conduits 28, 30, and 32. Particularly, adapter 94 includes a first cylindrical tube 96 interconnected to a second cylindrical tube 98 by a radially extending flange 100. Tube 96 has an outside surface of a size for slideable receipt in conduits 28, 30, or 32 and an inside surface having a diameter generally equal to that of shoulders 92. In the preferred form, tube 96 has a length such that the free end of tube 96 abuts shoulder 92 when flange 100 abuts the free end of conduits 28, 30, or 32. Tube 98 has an inside surface of a diameter greater than that of conduits 28, 30, or 32 and in the preferred form is of a size for slideable receipt of a hose having an inner diameter generally equal to that of conduits 28, 30, and 32. Tube 98 has an outside surface of a diameter greater than that of conduits 28, 30, or 32 and of the inside surface of tube 98 and in the preferred form is of a size for slideable receipt in a hose having an inner diameter greater than that of conduits 28, 30, and 32.

Thus, three different hose sizes can be secured to valve 26 according to the preferred teachings of the present invention. Specifically, without adapter 94, a hose of a first size can be slid into conduits 28, 30, or 32 as illustrated with hose 18b received in conduit 30 in FIG. 6. Alternately, a hose of medium size can be slid into tube 98 of adapter 94 as illustrated with hose 18b received in adapter 94 in turn received in conduit 28 in FIG. 6. Likewise, a large hose can be slid over tube 98 of adapter 94 as illustrated with hose 44 received on adapter 94 in turn received in conduit 32 in FIG. 6.

Adapter 94 and the hoses can be secured together and to conduits 28, 30, and 32 by any suitable means such as by set screws and hose clamps as shown. It of course should be realized that FIG. 6 has been presented for illustrative purposes showing three different securement methods to allow the attachment of three different sizes of hoses to valve 26, as three different size hoses are utilized by all the suppliers of air drills 12. In the field, typically all the hoses would be of the same size depending upon what size was utilized by the supplier for the particular air drill 12 to which apparatus 10 according to the teaching of the present invention is desired to be added so only one type of securement would be utilized in conjunction with valve 26 and not all three as illustrated in FIG. 6.

Now that the basic constructions of the preferred forms of apparatus 10 according to the preferred teachings of the present invention have been explained, the operation and advantages of apparatus 10 can be set forth and appreciated. Specifically, with element 34 of valve 26 in its first position, air drill 12 would operate as it would without apparatus 10 with seed being delivered by hoses 18 to all planter units 20. However, when a tramline is desired to be formed, solenoid actuator 40 may be activated to move butterfly element 34 of butterfly valve 26 from its first position to its second position against the bias of spring 36. With butterfly element 34 in its second position, seed passing through hose 18b is diverted from row planter unit 20b to row planter unit 20a in a manner shown in FIGS. 1 and 2 or to row planter units 20a and 20c in a manner as shown in FIGS. 3 and 4. As no seed passes to row planter unit 20b, no seeds are planted between row planter units 20a and 20c, with the spacing between row planter units 20a and 20c forming the tramline. When the desired tramline has been completed, solenoid actuator 40 may be deactivated allowing spring 36 to move butterfly element 34 from the second position to its first position. With butterfly element 34 in its first position, seed passing through hose 18b is again directed to row planter unit 20b.

It can then be appreciated that seed that would have gone into the tramline row of row planter unit 20b is diverted into the adjacent rows. Thus, hose 18b is not blocked and problems encountered when selected rows were blocked or when seed flow was stopped are eliminated. Specifically, seed does not collect in hose 18b as could occur if hose 18b was blocked but rather is diverted to adjacent rows. Thus, the plant population is not reduced as the diverted seeds are planted in the adjacent rows. The higher plant population in the adjacent rows to the tramline helps to eventually cover and shade the tramline to help control weed growth in the tramline. Although seed is not planted in the tramline, reducing the area actually planted, reduction in yield is not similarly reduced when seed is diverted to adjacent rows, especially when tramlines are spaced more than 36 feet (12 meters) apart. Furthermore, it should be noted that tramlines may be selectively created utilizing apparatus 10 according to the teachings of the present invention such that tramlines are created only on the desired passes to correspond to the desired pattern.

It should be noted that the angular relationships of conduits 28, 30, and 32 and of passages 48 and 50 allow the smooth transition of the seeds therethrough without creating abutments which may cause the seeds to pile up behind or which the seeds may strike causing seed breakage. This feature is particularly important when apparatus 10 is utilized in an air drill 12 as in the preferred form where delivery of the seed is made by propelling the seed utilizing forced air.

In this regard, it is believed that valve 26 shown in FIGS. 5 and 6 is particularly advantageous especially when apparatus 10 according to the preferred teachings of the present invention is utilized in air drills 12. Specifically, shoulder depressions 90 allow the smooth transition of seed from the inlet passageway defined by walls 66 and 70 to the outlet passageways defined by walls 64, 68, and 70 through main body section 62. Particularly, the free edge of dividing portion 82 is pivotal between and nested behind shoulder 90 with flat surface 84 generally contiguous with walls 68 whether element 34 is positioned to direct seed to outlet conduit 32 as shown in solid in FIG. 6 or to direct seed to outlet conduit 30 as shown in phantom in FIG. 6. Thus, the free edge of element 84 does not present an obstruction to the smooth transition of seed through valve 26 and without encountering the problems created by prior attempts at providing smooth transition. Specifically, the increased size and increased element pivot angle of prior valves including bent up collars positioned in the inlet with which the opposite ends of a valve plate alternately abutted are avoided with valve 26 according to the teachings of the present invention. Likewise, although elements having angled outer surfaces reduced the thickness of the free edge, such prior elements still provide a free edge creating an abutment and which are prone to wear, with angled elements typically formed of multipiece construction which was relatively expensive to manufacture.

Likewise, with the concentric pivoting of semicylindrical portion 86 inside of semicylindrical depression 72, the outside surfaces of V-shaped portion 88 are generally contiguous between surfaces 84 of element 34 to the surfaces of wall 68 whether element 34 is positioned to direct seed to outlet conduit 32 as shown in solid in FIG. 6 or to direct seed to outlet conduit 30 as shown in phantom in FIG. 6 to allow the smooth transition of seed therethrough. It should then be noted that the size of the passage is generally constant through valve 26 from conduit 28 through either conduit 30 or 32 and also does not change with the position of element 34 as surface 84 of element 34 is generally parallel to the respective side wall 64 depending upon the position of element 34. Thus, seed does not pile up or directly strike surfaces 84 as can occur if the butterfly element pivoted between angular positions which were not parallel to the outlet side walls creating a larger passageway inside of the housing, does not pile up or directly strike the free edge of element 34 as can occur if not nested behind shoulder 90, and/or does not pile up or directly strike shaft 78, head portion 80, and/or outlet wall 68 as can occur if these elements are positioned inside of the passage through the housing 58 of valve 26. Seed pile-up is detrimental as the simultaneous release of seed can create extreme seed populations as well as waste seed. Seeds striking objects can cause seed breakage and thus reducing the total seed available for germination.

It is further believed that butterfly element 34 and its relationship with housing 58 of the preferred form of the present invention is advantageous. Particularly, in addition to the advantages in providing smooth transition as set forth previously, the one piece design allows element 34 to be cast such as from plastic requiring no assembly. Further, the mass of element 34 is minimized allowing ease of pivoting by actuator 40. Furthermore, the rectangular shape of element 34 allows tolerances to be more tightly held with housing 58 even during pivotal movement, as relatively loose tolerances may allow material to pass through or jam between element 34 and housing 58, which may prevent pivoting of element 34 by actuator 40.

It can then be appreciated that apparatus 10 allows the creation of tramlines in fields, with such tramlines obtaining the many advantages associated therewith including providing guides for spraying, providing locations for observing undesired plant growth, providing implement paths in the fields, and like advantages. Further, apparatus 10 allows the creation of such tramlines without encountering problems previously occurring in the creation of tramlines. Thus, apparatus 10 will further encourage the use of tramlines by farmers.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Valve for diverting passage of material such as seed from an inlet conduit to either first or second outlet conduits comprising, in combination: a housing defining an inlet passageway in communication with the inlet conduit and first and second outlet passageways in communication with the first and second outlet conduits with the housing including a V-shaped outlet wall including first and second outlet surfaces defining the first and second outlet passageways, with the V-shaped outlet wall including a semicylindrical depression at the junction of the first and second outlet surfaces, with the inlet and outlet passageways having the same cross sectional size, being integral and intersecting in a generally Y configuration; a butterfly element movable between a first position allowing passage from the inlet passageway to the first outlet passageway and preventing passage to the second outlet passageway and a second position allowing passage from the inlet passageway to the second outlet passageway and preventing passage to the first outlet passageway, with the butterfly element including a free edge and first and second divider surfaces, with the free edge of the butterfly element having a thickness generally equal to the thickness between the first and second divider surfaces and having a height; first and second shoulder depressions formed in the first and second outlet passageways adjacent to the inlet passageway, with the shoulder depressions each having a depth generally equal to the thickness of the free edge of the butterfly element and having a height generally equal to the height of the free edge of the butterfly element for nesting of the free edge of the butterfly element, with the free edge of the butterfly element being moveable between the first and second shoulder depressions with the free edge of the butterfly element in the first position nesting with the first shoulder depression and the first divider surface of the butterfly element being generally contiguous with the inlet passageway and with the free edge of the butterfly element in the second position nesting with the second shoulder depression and the second divider surface of the butterfly element being generally contiguous with the inlet passageway; wherein the butterfly element further comprises: a semicylindrical portion, a generally V-shaped portion having first and second flat walls, and a dividing portion terminating in the free edge and having the first and second divider surfaces, with the divider surfaces being flat and parallel, with the V-shaped portion extending outwardly from the first and second divider surfaces to the semicylindrical portion, with the first and second divider surfaces extending substantially the full length from the free edge to the V-shaped portion, with the V-shaped portion and the semicylindrical portion providing a smooth transition between the divider surfaces of the butterfly element and the first and second outlet surfaces, with the semicylindrical portion of the butterfly element having a size complimentary to and for concentric pivotal movement inside of the semicylindrical depression and for providing a linear transition between one of the flat walls of the V-shaped portion of the butterfly element and the corresponding outlet surface of the V-shaped outlet wall.

2. The valve of claim 1 wherein the butterfly element is pivotal about a pivot axis between the first and second positions.

3. The valve of claim 2 wherein the housing includes a V-shaped outlet wall including first and second outlet surfaces defining the first and second outlet passageways, with the pivot axis being positioned at the junction of the first and second outlet surfaces of the V-shaped outlet wall.

4. The valve of claim 3 wherein the first and second divider surfaces of the butterfly element are parallel forming a dividing portion extending substantially the full length from the free edge to the pivot axis; and wherein the butterfly element is formed of one piece and includes a semicylindrical portion and a generally V-shaped portion extending outwardly from the first and second divider surfaces to the semicylindrical portion, with the pivot axis located within the semicylindrical portion and the V-shaped portion, with the V-shaped portion and the semicylindrical portion providing a smooth transition between the divider surfaces of the butterfly element and the first and second outlet surfaces.

5. The valve of claim 4 wherein the V-shaped outlet wall includes a semicylindrical depression at the junction of the first and second outlet surfaces, with the semicylindrical portion of the butterfly element having a size complementary to and for concentric pivotal movement inside of the semicylindrical depression.

6. The valve of claim 5 wherein the housing comprises, in combination: first and second flat, planar side walls; flat, planar top and bottom walls interconnected to and between the side walls, with the outlet surfaces being flat and planar and extending between the top and bottom walls intermediate the side walls, with the outlet conduits being defined by and between the top and bottom walls, the first and second side walls, and the first and second outlet surfaces; and wherein the butterfly element has a rectangular configuration with the free edge extending along a straight line.

7. The valve of claim 1 further comprising, in combination: an adapter including a first tube in communication with a second tube, with the first tube having a size and shape for slideable receipt in the conduits, and with the second tube having an inner surface for the slideable receipt of a hose of a size larger than the first tube and having an outer surface for the slideable receipt of a hose of a size larger than a hose which can be slideably received in the inner surface of the second tube.

8. The valve of claim 7 further comprising a shoulder formed in the inlet passageway and in each of the outlet passageways, with the first tube having a free end, with the free end of the first tube when slideably received in one of the inlet and outlet conduits abutting with the shoulder of the corresponding passageway of the conduit in which the first tube is slideably received.

9. The valve of claim 8 wherein the first tube is interconnected to the second tube by a radial flange; and wherein each of the conduits have free ends for abutting with the radial flange of the first tube, with the free end of the first tube when slideably received in one of the inlet and outlet conduits abutting with the shoulder of the corresponding passageway of the conduit in which the first tube is slideably received and the free end of the conduit abuts with the flange of the adapter.

10. The valve of claim 1 wherein the housing comprises, in combination: first and second flat, planar side walls; flat, planar top and bottom walls interconnected to and between the side walls, with the outlet conduits being defined by and between the top and bottom walls and the first and second side walls; and wherein the butterfly element has a rectangular configuration with the free edge extending along a straight line.

11. The valve of claim 2 wherein the first and second divider surfaces of the butterfly element are parallel forming a dividing portion extending substantially the full length from the free edge to the pivot axis; and wherein the butterfly element is formed of one piece and includes a semicylindrical portion and a generally V-shaped portion extending outwardly from the first and second divider surfaces to the semicylindrical portion, with the pivot axis located within the semicylindrical portion and the V-shaped portion.

12. The valve of claim 1 wherein the butterfly element is moveable through an angle in the order of 40° between the first and second positions; wherein the shoulder depressions extend from the outlet passageway at an angle in the order of 22½°; and where the inlet and outlet passageways extend at an angle in the order of 157½° and the first and second outlet passageways extend at an angle in the order of 30°.

13. Valve for diverting passage of material such as seed from an inlet conduit to either first or second outlet conduits comprising, in combination: a housing defining an inlet passageway in communication with the inlet conduit and first and second outlet passageways in communication with the first and second outlet conduits, with the housing including a V-shaped outlet wall including first and second outlet surfaces defining the first and second outlet passageways, with the V-shaped outlet wall including a semicylindrical depression at the junction of the first and second outlet surfaces, with the inlet and outlet passageways intersecting in a generally Y configuration; and a butterfly element pivotal about a pivot axis between a first position allowing passage from the inlet passageway to the first outlet passageway and preventing passage to the second outlet passageway and a second position allowing passage from the inlet passageway to the second outlet passageway and preventing passage to the first outlet passageway, with the pivot axis being positioned at the junction of the first and second outlet surfaces of the V-shaped outlet wall, wherein the butterfly element is formed of one piece and includes a semicylindrical portion, a generally V-shaped portion having first and second flat walls, and a dividing portion terminating in a free edge and having first and second, flat, parallel divider surfaces, with the V-shaped portion extending outwardly from the first and second divider surfaces to the semicylindrical portion, with the pivot axis located within the semicylindrical portion and the V-shaped portion, with the first and second divider surfaces extending substantially the full length from the free edge to the V-shaped portion, with the V-shaped portion and the semicylindrical portion providing a smooth transition between the divider surfaces of the butterfly element and the first and second outlet surfaces, with the semicylindrical portion of the butterfly element having a size complementary to and for concentric pivotal movement inside of the semicylindrical depression and for providing a linear transition between one of the flat walls of the V-shaped portion of the butterfly element and the corresponding outlet surface of the V-shaped outlet wall.

14. The valve of claim 12 wherein the housing comprises, in combination: first and second flat, planar side walls; flat, planar top and bottom walls interconnected to and between the side walls, with the outlet surfaces being flat and planar and extending between the top and bottom walls intermediate the side walls, with the outlet conduits being defined by and between the top and bottom walls, the first and second side walls, and the first and second outlet surface; and wherein the butterfly element has a rectangular configuration with the free edge extending along a straight line.

15. The valve of claim 12 further comprising, in combination: an adapter including a first tube in communication with a second tube, with the first tube having a size and shape for slideable receipt in the conduits, and with the second tube having an inner surface for the slideable receipt of a hose of a size larger than the first tube and having an outer surface for the slideable receipt of a hose of a size larger than a hose which can be slideably received in the inner surface of the second tube.

16. In a seeding device including at least a first row planter unit located adjacent to a second row planter unit and a third row planter unit located adjacent to the second row planter unit, with the second row planter unit being intermediate the first and third row planter units, first means for delivering metered seed to the first row planter unit, second means for delivering metered seed to the second row planter unit, and third means for delivering metered seed to the third row planter unit, an apparatus for selectively creating a tramline comprising means located in the second means for diverting all of the metered seed of the second means from the second row planter unit to at least one of the first and third row planter units for planting with the metered seed delivered by the first and third means, with the seed diverted from the second means creating higher plant population rows as defined by the first and third row planter units adjacent to the tramline, wherein the diverting means comprises a valve comprising, in combination: a housing defining an inlet passageway in communication with the second means, a first outlet passageway in communication with the second row planter unit, a second outlet passageway in communication with at least one of the first and third row planter units, and a V-shaped outlet wall including first and second outlet surfaces defining the first and second outlet passageways, with the V-shaped outlet wall including a semicylindrical depression at the junction of the first and second outlet surfaces, with the inlet and outlet passageways intersecting in a generally Y configuration; and a butterfly element pivotal about a pivot axis between a first position allowing passage from the inlet passageway to the first outlet passageway and preventing passage to the second outlet passageway and a second position allowing passage from the inlet passageway to the second outlet passageway and preventing passage to the first outlet passageway, with the butterfly element being formed of one piece and including a semicylindrical portion, a generally V-shaped portion having first and second flat walls, and a dividing portion terminating in a free edge and having first and second, flat, parallel divider surfaces, with the V-shaped portion extending outwardly from the first and second divider surfaces to the semicylindrical portion, with the pivot axis located within the semicylindrical portion and the V-shaped portion, with the first and second divider surfaces extending substantially the full length from the free edge to the V-shaped portion, with the V-shaped portion and the semicylindrical portion providing a smooth transition between the divider surfaces of the butterfly element and the first and second outlet surfaces, with the semicylindrical portion of the butterfly element having a size complementary to and for concentric pivotal movement inside of the semicylindrical depression and for providing a linear transition between one of the flat walls of the V-shaped portion of the butterfly element and the corresponding outlet surface of the V-shaped outlet wall.

17. The seeding device of claim 16 wherein the V-shaped outlet wall includes a semicylindrical depression at the junction of the first and second outlet surfaces, with the semicylindrical portion of the butterfly element having a size complementary to and for concentric pivotal movement inside of the semicylindrical depression.

18. The seeding device of claim 16 wherein the housing comprises, in combination: first and second flat, planar side wall; flat, planar top and bottom walls interconnected to and between the side walls, with the outlet surfaces being flat and planar and extending between the top and bottom walls intermediate the side walls, with the outlet conduits being defined by and between the top and bottom walls, the first and second side walls, and the first and second outlet surfaces; and wherein the butterfly element has a rectangular configuration with the free edge extending along a straight line.

19. The seeding device of claim 16 further comprising, in combination: first and second shoulder depressions formed in the first and second outlet passageways adjacent to the inlet passageway, with the free edge of the butterfly element having a thickness generally equal to the thickness between the first and second divider surfaces, with the shoulder depressions each having a depth generally equal to the thickness of the free edge of the butterfly element for nesting of the free edge of the butterfly element, with the free edge of the butterfly element being movable between the first and second shoulder depressions with the free edge of the butterfly element in the first position nesting with the first shoulder depression and the first divider surface of the butterfly element being generally contiguous with the inlet passageway and with the free edge of the butterfly element in the second position nesting with the second shoulder depression and the second divider surface of the butterfly element being generally contiguous with the inlet passageway.

20. The valve of claim 12 further comprising, in combination: first and second shoulder depressions formed in the first and second outlet passageways adjacent to the inlet passageway, with the free edge of the butterfly element having a thickness generally equal to the thickness between the first and second divider surfaces, with the shoulder depressions each having a depth generally equal to the thickness of the free edge of the butterfly element for nesting of the free edge of the butterfly element, with the free edge of the butterfly element being movable between the first and second shoulder depressions with the free edge of the butterfly element in the first position nesting with the first shoulder depression and the first divider surface of the butterfly element being generally contiguous with the inlet passageway and with the free edge of the butterfly element in the second position nesting with the second shoulder depression and the second divider surface of the butterfly element being generally contiguous with the inlet passageway.

* * * * *